(12) United States Patent
McGrath et al.

(10) Patent No.: US 9,251,030 B2
(45) Date of Patent: Feb. 2, 2016

(54) DOWNLOADABLE CARTRIDGES FOR A MULTI-TENANT PLATFORM-AS-A-SERVICE (PAAS) SYSTEM

(71) Applicant: Red Hat, Inc., Raleigh, NC (US)

(72) Inventors: Michael McGrath, Schaumburg, IL (US); Jhon Honce, Cave Creek, AZ (US); Paul Morie, Georgetown, SC (US); Daniel Mace, Morgantown, WV (US)

(73) Assignee: Red Hat, Inc., Raleigh, NC (US)

( * ) Notice: Subject to any disclaimer, the term of this patent is extended or adjusted under 35 U.S.C. 154(b) by 151 days.

(21) Appl. No.: 14/188,772

(22) Filed: Feb. 25, 2014

(65) Prior Publication Data

US 2015/0195337 A1 Jul. 9, 2015

Related U.S. Application Data

(60) Provisional application No. 61/925,381, filed on Jan. 9, 2014.

(51) Int. Cl.
| | |
|---|---|
| *G06F 15/16* | (2006.01) |
| *G06F 11/34* | (2006.01) |
| *G06F 9/54* | (2006.01) |
| *G06F 17/30* | (2006.01) |
| *H04L 12/24* | (2006.01) |
| *H04L 29/08* | (2006.01) |

(52) U.S. Cl.
CPC ............ *G06F 11/3409* (2013.01); *G06F 9/541* (2013.01); *G06F 17/30082* (2013.01); *G06F 17/30174* (2013.01); *G06F 17/30194* (2013.01); *G06F 17/30309* (2013.01); *G06F 17/30356* (2013.01); *H04L 41/082* (2013.01); *H04L 67/06* (2013.01); *H04L 67/34* (2013.01); *G06F 2209/544* (2013.01)

(58) Field of Classification Search
CPC .. G06F 17/30194; H04L 41/082; H04L 67/34
USPC .................................................. 709/217–219
See application file for complete search history.

(56) References Cited

U.S. PATENT DOCUMENTS

| | | | | |
|---|---|---|---|---|
| 2011/0185014 A1* | 7/2011 | Eccles | ................ | G06F 9/44505 709/203 |
| 2014/0075432 A1* | 3/2014 | McGrath | ................ | G06F 9/455 718/1 |
| 2014/0156519 A1* | 6/2014 | Thompson | ............. | G06Q 10/10 705/40 |
| 2014/0173554 A1* | 6/2014 | Gupta | ....................... | G06F 8/38 717/106 |
| 2014/0196044 A1* | 7/2014 | Fernando | ............. | G06F 9/5027 718/102 |
| 2014/0289391 A1* | 9/2014 | Balaji | ..................... | H04L 43/04 709/224 |
| 2015/0242199 A1* | 8/2015 | Goldstein | ................ | G06F 8/70 717/120 |

* cited by examiner

*Primary Examiner* — Mohamed Wasel
(74) *Attorney, Agent, or Firm* — Lowenstein Sandler LLP

(57) ABSTRACT

Implementations for downloadable cartridges for a multi-tenant Platform-as-a-Service (PaaS) system are disclosed. A method of the disclosure includes receiving, by a processing device of a multi-tenant Platform-as-a-Service (PaaS) system, a location of a cartridge manifest corresponding to a cartridge that is maintained outside of the multi-tenant PaaS system, downloading the cartridge manifest from the received location, parsing the downloaded cartridge manifest to determine a source location of files of the cartridge, the source location separate from the multi-tenant PaaS system, and causing the files of the cartridge to be obtained from the determined source location for use by at least one node of the multi-tenant PaaS system that is hosting an application requesting the cartridge.

20 Claims, 4 Drawing Sheets

DOWNLOADABLE CARTRIDGES FOR A MULTI-TENANT PLATFORM-AS-A-SERVICE (PAAS) SYSTEM

RELATED APPLICATION

This application claims the benefit under 35 U.S.C. §119 (e) of U.S. Patent Provisional Application No. 61/925,381, filed on Jan. 9, 2014, the entirety of which is incorporated herein by reference.

TECHNICAL FIELD

The implementations of the disclosure relate generally to computing infrastructures and, more specifically, relate to downloadable cartridges for a multi-tenant Platform-as-a-Service (PaaS) system.

BACKGROUND

Currently, a variety of Platform-as-a-Service (PaaS) offerings exist that include software and/or hardware facilities for facilitating the execution of web applications. In some cases, these PaaS offerings utilize a cloud computing environment (the "cloud") to support execution of the web applications. Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware, software, and provisioning hosting capabilities, providing the facilities to support the complete life cycle of building, delivering, and servicing web applications that are entirely available from the Internet. Typically, these facilities operate as one or more virtual machines (VMs) running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide downloadable cartridges for a multi-tenant Platform-as-a-Service (PaaS) system. In one implementation, a cartridge of the PaaS system may be written by a cartridge author and utilized in deployed applications by application developers. The PaaS system may include a broker server with a cartridge download component to manage the installation of third-party custom cartridges ("downloadable cartridges") that are created outside of the PaaS system. In one implementation, the cartridge download component receives identification of a cartridge manifest of a downloadable cartridge, downloads the identified cartridge manifest, parses the downloaded cartridge manifest to determine a source location of files of the downloadable cartridge, obtains the downloadable cartridge from the source location, and deploys the obtained downloadable cartridge to a node of the PaaS. Implementations of the disclosure allow for the download and deployment of fully-featured cartridges that are not maintained or controlled by the PaaS system. In addition, the downloadable cartridges do not have to be maintained on a cartridge library or repository of a node before being deployed on that node.

Previously, cartridges of a PaaS system were generated and maintained by the PaaS system. Third-party cartridge authors were not able to create and provide their cartridges for use on the PaaS system. Furthermore, cartridges of previous-implementations of PaaS system were stored and maintained at the nodes of the PaaS system. This did not provide for flexibility and/or adaptability of the PaaS systems. Implementations of the disclosure overcome this drawback by providing downloadable cartridges written by third-party cartridge authors that may be obtained from outside of the PaaS system. These downloadable cartridges may be installed on-the-fly, meaning the cartridges do not have to be deployed and stored at the nodes hosting the applications utilizing the downloadable cartridges.

Figure 1:
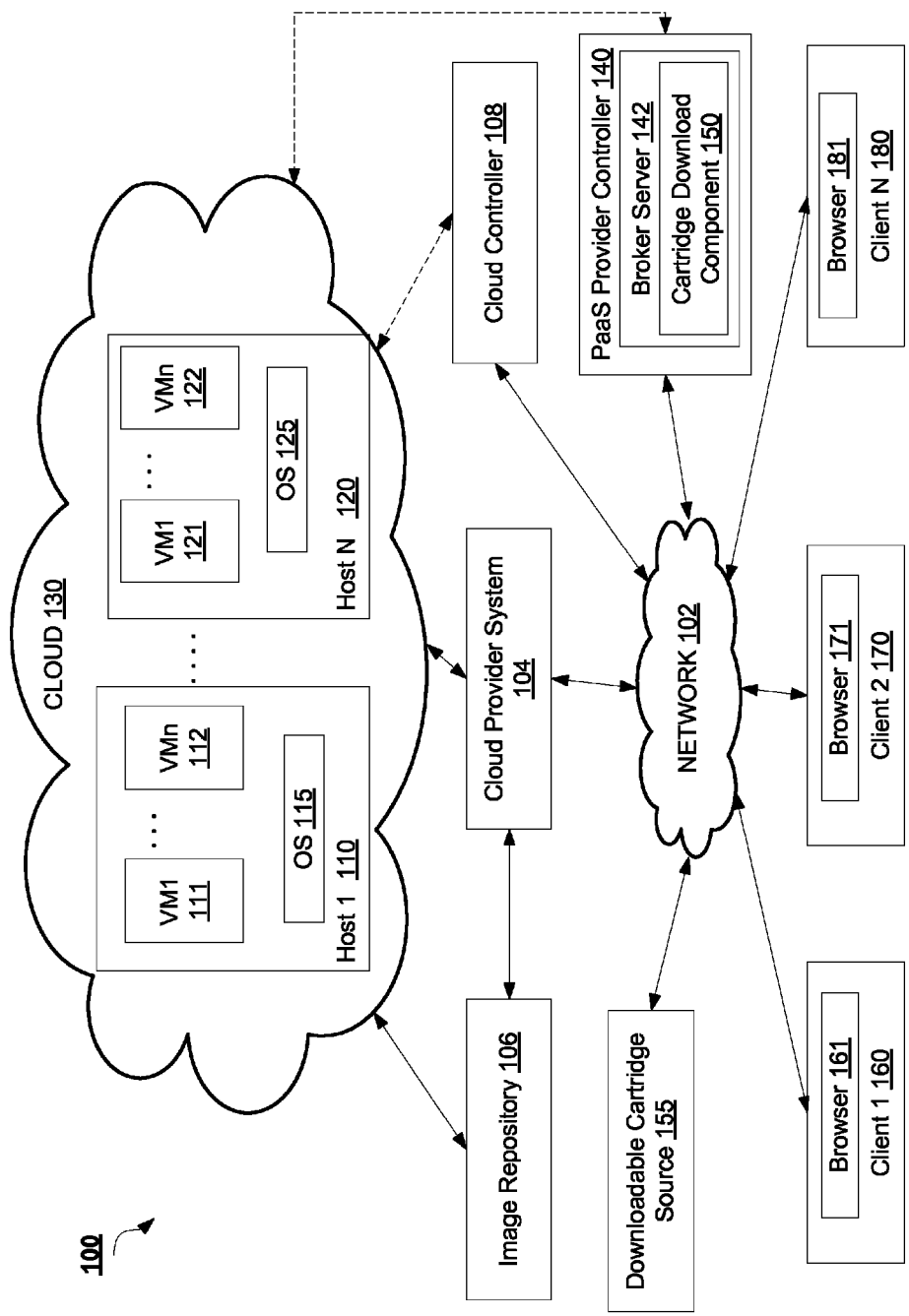
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes to execute software and/or other processes. In some implementations, these nodes are virtual machines (VMs), such as VMs 111, 112, 121, and 122 hosted in cloud 130. Each VM 111, 112, 121, 122 is hosted on a physical machine, such as host 1 110 through host N 120, configured as part of the cloud 130. The VMs 111, 112, 121, 122 may be executed by OSes 115, 125 on each host machine 110, 120.

In some implementations, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181. In other implementations, the applications may be hosted directly on hosts 1 through N 110-120 without the use of VMs (e.g., a "bare metal" implementation), and in such an implementation, the hosts themselves are referred to as "nodes".

Clients 160, 170 and 180 are connected to hosts 110, 120 on cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS provider controller 140. Based on these commands, the cloud controller 108 provides data (e.g., such as pre-generated images) associated with different applications to the cloud provider system 104. In some implementations, the data may be provided to the cloud provider 104 and stored in an image repository 106, or in an image repository (not shown) located on each host 110, 120, or in an image repository (not shown) located on each VM 111, 112, 121, 122. This data is used for the execution of applications for a multi-tenant PaaS system managed by the PaaS provider controller 140.

In one implementation, a cartridge of the PaaS system may be written by a cartridge author and utilized in deployed applications by application developers. The PaaS provider controller 140 may include a broker server 142 with a cartridge download component 150 to manage the installation of third-party custom cartridges ("downloadable cartridges") that are created outside of the PaaS system. In one implementation, the cartridge download component 150 receives identification of a cartridge manifest corresponding to a downloadable cartridge, downloads the identified cartridge manifest, parses the downloaded cartridge manifest to determine a source location of files of the downloadable cartridge, obtains the downloadable cartridge from the source location, and deploys the obtained downloadable cartridge to a node of the PaaS. Implementations of the disclosure allow for the download and deployment of fully-featured cartridges that are not maintained or controlled by the PaaS system. In addition, the downloadable cartridges do not have to be maintained on a cartridge library or repository of a node before being deployed on that node. Further details of providing installation and update of cartridges in a multi-tenant PaaS system are described below with respect to FIG. 2.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
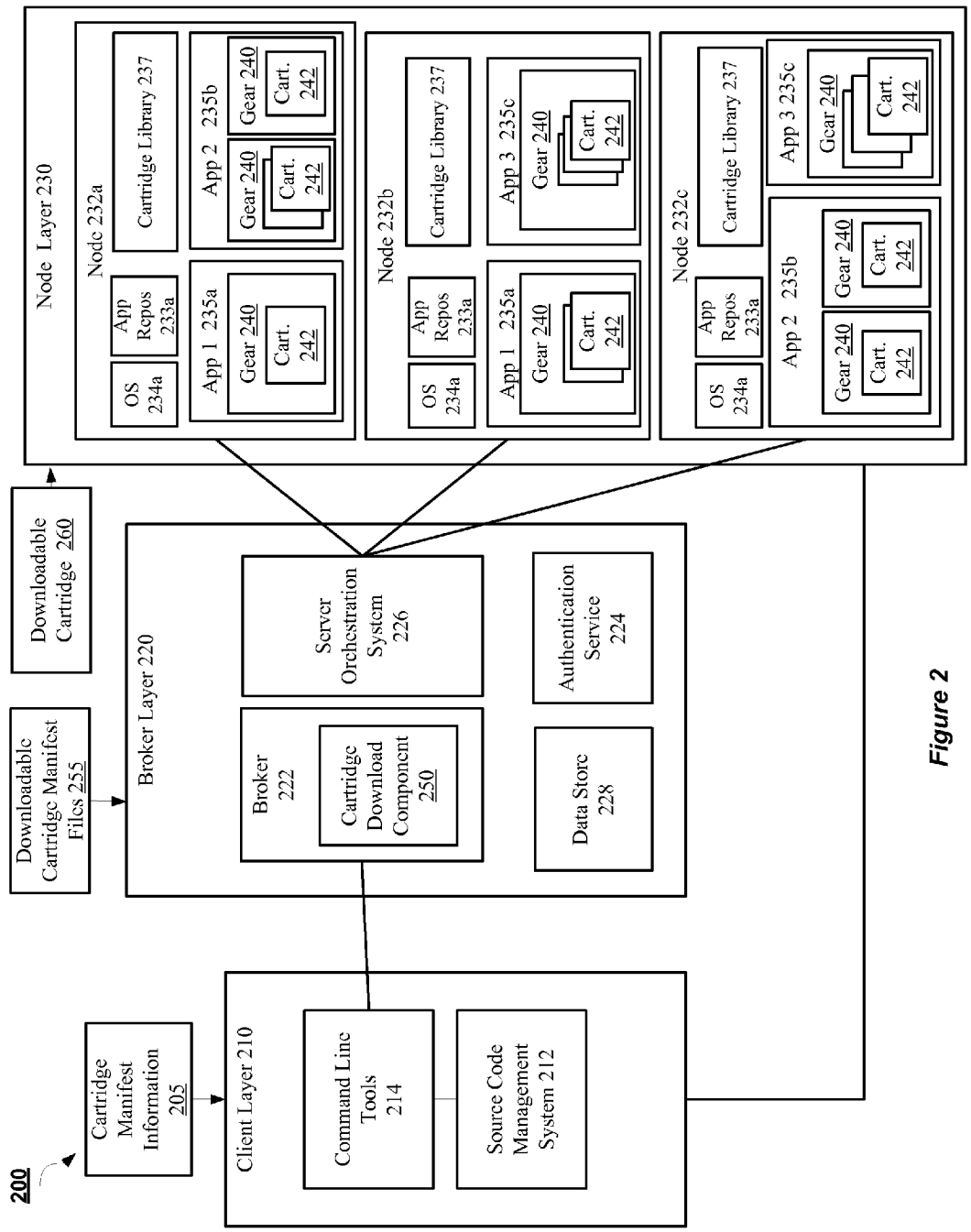
FIG. 2 is a block diagram of a Platform-as-a-Service (PaaS) system architecture according to an implementation of the disclosure.

FIG. 2 is a block diagram of a PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a broker layer 220, and a node layer 230.

In one implementation, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Another example of an SCM or revision control system is Debian, also available as open source software. Git, Debian, and other such distributed SCM systems, usually include a working directory for making changes, and a local software repository for storing the changes for each application associated with the end user of the PaaS system 200. The packaged software application can then be "pushed" from the local SCM repository to a remote SCM repository, such as app repos 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 make use of an application programming interface ("API") of the broker layer 220 and perform other applications management tasks in an automated fashion using other interfaces, as will be described in more detail further below in accordance with some implementations.

In one implementation, the broker layer 220 acts as middleware between the client layer 210 and the node layer 230. The node layer 230 includes the nodes 232a-c on which software applications 235a-c are provisioned and executed. In one implementation, each node 232a-c is a VM provisioned by an Infrastructure-as-a-Service (IaaS) provider. In other implementations, the nodes 232a-c may be physical machines (e.g., bare metal) or VMs residing on a single physical machine and running gears (discussed below) that provide functionality of applications of a multi-tenant PaaS system. In one implementation, the broker layer 220 is implemented on one or more machines, such as server computers, desktop computers, etc. In some implementations, the broker layer 220 may be implemented on one or more machines separate from machines implementing each of the client layer 210 and the node layer 230, or may implemented together with the client layer 210 and/or the node layer 230 on one or more machines, or some combination of the above.

In one implementation, the broker layer 220 includes a broker 222 that coordinates requests from the client layer 210 with actions to be performed at the node layer 230. One such request is new application creation. In one implementation, when a user, using the command line tools 214 at client layer 210, requests the creation of a new application 235a-c, or some other action to manage the application 235a-c, the broker 222 first authenticates the user using an authentication service 224. In one implementation, the authentication service may comprise custom authentication methods, or standard protocols such as SAML, OAuth, etc. Once the user has been authenticated and allowed access to the system by authentication service 224, the broker 222 uses a server orchestration system 226 to collect information and configuration information about the nodes 232a-c.

In one implementation, the broker 222 uses the Marionette Collective™ ("MCollective™") framework available from Puppet Labs™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the broker 222 manages the business logic and model representing the nodes 232a-c and the applications 235a-c residing on the nodes, and acts as a controller that generates the actions requested by users via an API of the client command line tools 214. The server orchestration system 226 then takes the actions generated by the broker 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud based storage service provided by a Storage-as-a-Service (SaaS) provider, such as Amazon™ S3™ (Simple Storage Service). The broker 222 uses the information about the nodes 232a-c and their applications 235a-c to model the application hosting service and to maintain records about the nodes. In one implementation, data of a node 232a-c is stored in the form of a JavaScript Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some implementations, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software (or middleware) providing the functionality, such as configuration templates, scripts, and/or dependencies, to run an application 235a-c and/or add a feature to an application, 235a-c. In one implementation, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance 242 of a cartridge from cartridge library 237 to an application 235a-c provides a capability for the application 235a-c, without the customer who owns the application having to administer or update the included capability.

In some implementations, a cartridge may include an entirely-functioning application. For example, the cartridge may include the entire code, application, dependencies, and so on to execute an application.

In one implementation, each node 232a-c is implemented as a VM and has an operating system 234a-c that can execute applications 235a-c using the app repos 233a-c and cartridge libraries 237 that are resident on the nodes 232a-c. Each node 302a-b also includes a server orchestration system agent (not shown) configured to track and collect information about the node 232a-c and to perform management actions on the node 232a-c. Thus, in one implementation, using MCollective™ as the server orchestration system 226, the server orchestration system agent (not shown) at the node 232a-c can act as a MCollective™ server. The server orchestration system 226 would then act as the MCollective™ client that can send requests, queries, and commands to the MCollective™ server agent on node 232a-c.

As previously mentioned, cartridges provide the underlying support software that implements the functionality of applications 235a-c. In one implementation, an application 235a-c may utilize one or more cartridge instances 242 that are run in one or more resource-constrained gears 240 on nodes 232a-c. Cartridge library 237 provides an OS-based location, outside of all application gears 240, that acts as a source for cartridge instantiations 242 that provide functionality for an application 235a-c.

An application 235a-c may use more than one cartridge instance 240 as part of providing functionality for the application 235a-b. One example of this is a JavaEE application that uses a JBoss™ AS7 cartridge with a supporting MySQL™ database provided by a MySQL™ cartridge. Each cartridge instance 242 may include a software repository that provides the particular functionality of the cartridge instance 242.

As mentioned above, a gear 240 is a resource-constrained process space on the node 232a-c to execute functionality of an application 235a-c. In some implementations, a gear 240 is established by the node 232a-c with resource boundaries, including a limit and/or designation of the amount of memory, amount of storage, and security types and/or labels to be applied to any functions executed by the gear 240. In one implementation, gears 240 may be established using the Linux Containers (LXC) virtualization method. In further implementations, gears 240 may also be established using cgroups, SELinux™, and kernel namespaces, to name a few examples. As illustrated in FIG. 2, cartridges instances 242 for an application 235a-c may execute in gears 240 dispersed over more than one node 232a-b. In other implementations, cartridge instances 242 for an application 235a-c may run in one or more gears 240 on the same node 232a-c.

Implementations of the disclosure provide installation and deployment of a downloadable cartridge 242 by the multi-tenant PaaS. In one implementation, broker layer 220 includes a cartridge download component 250 to provide support for the installation and deployment of the downloadable cartridge instances 242 of the multi-tenant PaaS 200. In one implementation, the cartridge download component 250 is part of broker 222. The cartridge download component 250 may be the same as cartridge download component 150 described with respect to FIG. 1.

In one implementation, a cartridge of the PaaS system may be written by a cartridge author and utilized in deployed applications by application developers. The cartridge download component 250 may manage the installation of third-party custom cartridges ("downloadable cartridges") that are created outside of the PaaS system. Previously, cartridges utilized by the multi-tenant PaaS system were deployed to each node 232a-c and maintained in the cartridge library 237 of the node 232a-c for instantiation to the applications 235a, b running on the node 232a-c. In one implementation, the downloadable cartridges are maintained in locations that are not operated by or controlled by the multi-tenant PaaS system. For example, the downloadable cartridges may be cartridges that are not kept in the cartridge library 237 of the node 232a-c.

When a user of the multi-tenant PaaS, such as an application developer, seeks to utilize a downloadable cartridge for an application 235a, b, cartridge manifest information 205 corresponding to the downloadable cartridge may be provided, via client layer 210, to the cartridge download component 250. A cartridge manifest information 205 may refer to information identifying a cartridge manifest associated with the downloadable cartridge. The cartridge manifest may be a file that details the features of the downloadable cartridge and includes fields utilized by the multi-tenant PaaS to deploy the downloadable cartridge to a node 232a-c and/or application 235a, b.

In one implementation, the cartridge manifest information 205 may be provided via a graphical user interface (GUI), such as a web interface, at the client layer 210. The GUI may be provided by the broker 222 to facilitate communication between the application developer and the multi-tenant PaaS. The cartridge manifest information 205 may include, but is not limited to, a Uniform Resource Locator (URL) from which cartridge manifest files 255 can be accessed.

In one implementation, the cartridge manifest information 205 is obtained from the cartridge author. For example, the cartridge author may identify and describe the downloadable cartridge in a web site, a blog post, or in some other communication medium. In addition, the multi-tenant PaaS may feature or otherwise identify a downloadable cartridge to users of the multi-tenant PaaS. In some implementations, the cartridge manifest files 255 may be provided from the user directly via the client layer 210.

After the cartridge manifest information 205 is received, the cartridge download component 250 downloads the identified cartridge manifest files 255 and parses the downloaded cartridge manifest files 255 to determine a source location of files 260 of the downloadable cartridge. In one implementation, the cartridge manifest files 255 includes a source location field that identifies a URL where the downloadable cartridge files 260 may be obtained. The cartridge download component 250 then directs one or more of the nodes 232a-c to obtain the downloadable cartridge files 260 from the source location. As a result, the cartridge download component 250 may manage the deployment of the obtained downloadable cartridge 260 to the requesting application 232a, b created by the requesting application developer on a node 232a-c of the multi-tenant PaaS system.

Implementations of the disclosure allow for the download and deployment of fully-featured cartridges that are not maintained or controlled by the PaaS system. In addition, the downloadable cartridges do not have to be maintained on a cartridge library or repository of a node before being deployed on that node.

Figure 3:
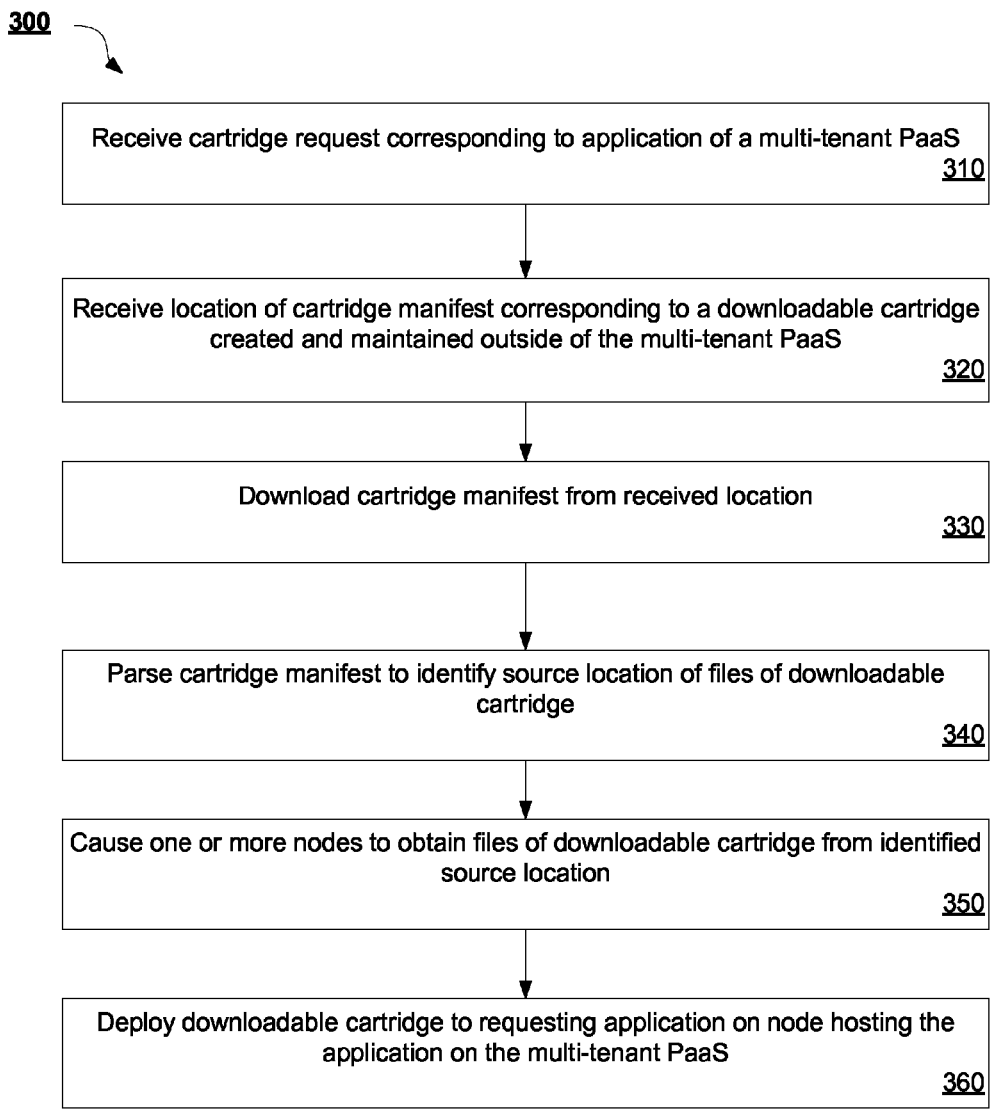
FIG. 3 is a flow diagram illustrating a method for providing downloadable cartridges in multi-tenant PaaS according to an implementation of the disclosure.

FIG. 3 is a flow diagram illustrating a method 300 for providing downloadable cartridges in multi-tenant PaaS according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by cartridge download component 250 described with respect to FIG. 2.

Method 300 begins at block 310, where a cartridge request is received at the cartridge download component of a broker of a multi-tenant PaaS system. In one implementation, the cartridge request corresponds to a downloadable cartridge that is created and maintained outside of the multi-tenant PaaS system. The downloadable cartridge may be written by a cartridge author that is third-party to the multi-tenant PaaS system. In one implementation, the cartridge request may be part of creating a new application on the multi-tenant PaaS, or may relate to an already-existing application on the multi-tenant PaaS.

At block 320, a location of a cartridge manifest corresponding to the downloadable cartridge is received. A cartridge manifest may be a file that details the features of the downloadable cartridge and includes fields utilized by the multi-tenant PaaS to deploy the cartridge to a node and/or applications of the multi-tenant PaaS. In one implementation, the cartridge manifest is provided via a GUI, such as a web interface, provided by the multi-tenant PaaS to interact with an application developer utilizing the multi-tenant PaaS. A user of the multi-tenant PaaS, such as an application developer, may provide a URL from which the cartridge manifest can be accessed.

At block 330, the cartridge manifest is downloaded from the received location. Then, at block 340, the cartridge manifest is parsed to identify a source location of files of the downloadable cartridge. In one implementation, the cartridge manifest includes, but is not limited to, a source location field that identifies a URL, or other source location, from which the files of the downloadable cartridge can be obtained. The source location may be a location that is separate from the multi-tenant PaaS system.

At block 350, the cartridge download component causes one or more nodes of the multi-tenant PaaS to obtain (e.g., download) files of the downloadable cartridge from the identified source location that was found in the cartridge manifest. Lastly, at block 360, the downloadable cartridge is deployed on a node hosting the application requesting the downloadable cartridge. The downloadable cartridge may be deployed for use by the application on the node (e.g., deployed as a cartridge instance for the requesting application).

Figure 4:
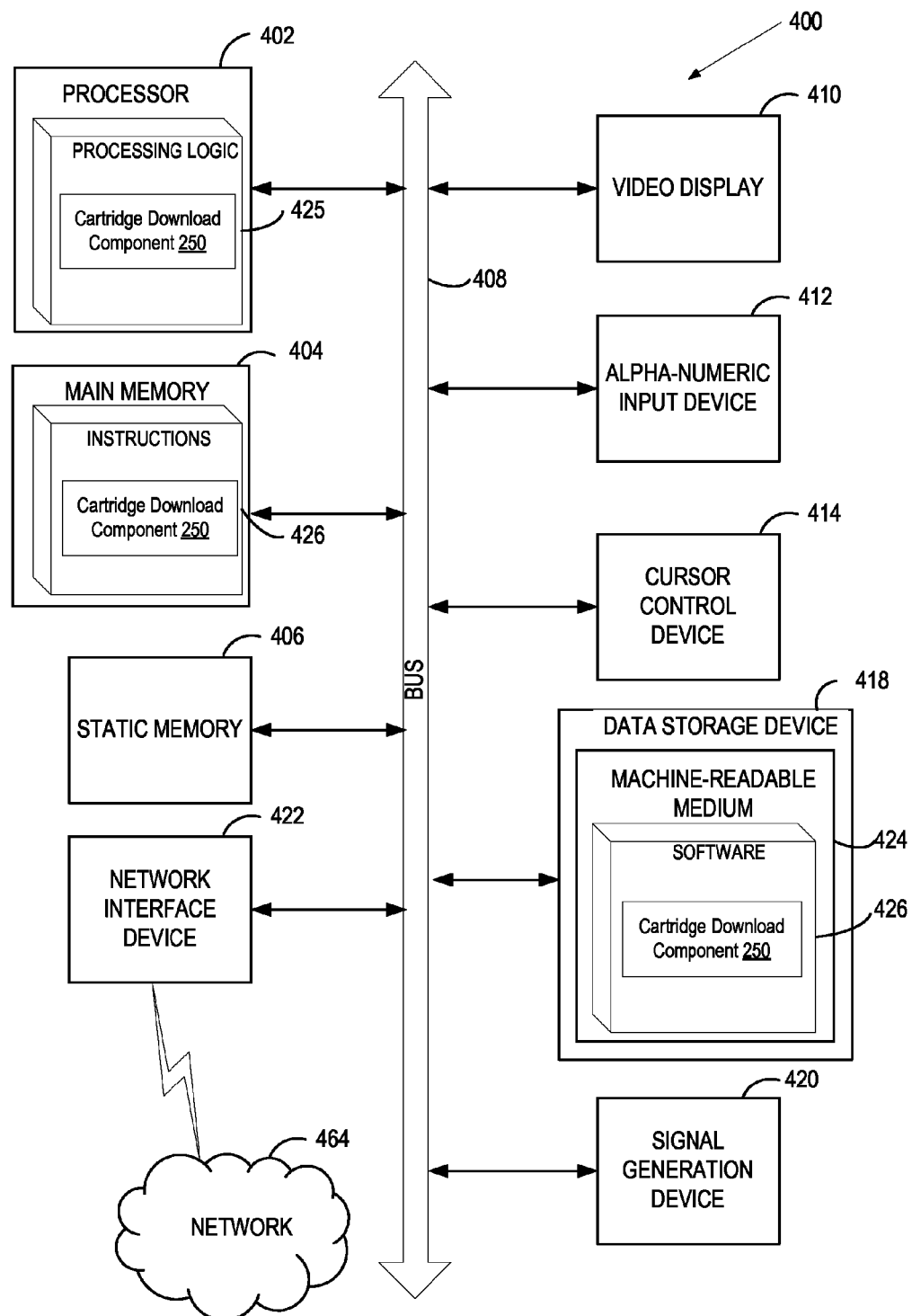
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to implement a cartridge download component 250 to manage installation of downloadable cartridges in a multi-tenant PaaS, such as cartridge download component 250 described with respect to FIG. 2, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "obtaining", "referencing", "determining", "providing", "implementing", "downloading", "parsing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   receiving, by a processing device of a multi-tenant Platform-as-a-Service (PaaS) system, a location of a cartridge manifest corresponding to a cartridge that is maintained outside of the multi-tenant PaaS system;
   downloading, by the processing device, the cartridge manifest from the received location;
   parsing, by the processing device, the downloaded cartridge manifest to determine a source location of files of the cartridge, the source location separate from the multi-tenant PaaS system; and
   causing, by the processing device, the files of the cartridge to be obtained from the determined source location for use by at least one node of the multi-tenant PaaS system that is hosting an application requesting the cartridge.

2. The method of claim 1, wherein the cartridges each provide functionality to execute applications on the multi-tenant PaaS system, the functionality comprising at least one of configuration templates, scripts, dependencies, or features to add to the applications.

3. The method of claim 1, wherein the cartridge manifest comprising a file detailing features of the cartridge and comprising fields utilized by the multi-tenant PaaS system to deploy the cartridge to the at least one node.

4. The method of claim 1, wherein the location of the cartridge manifest is a Uniform Resource Locator (URL).

5. The method of claim 1, wherein the parsing further comprises locating a source location field of the cartridge manifest and determining data of the source location field to indicate the source location of the files of the cartridge.

6. The method of claim 5, wherein the source location of the files of the cartridge is a Uniform Resource Locator (URL).

7. The method of claim 1, wherein the node is a virtual machine (VM) hosting the application, and wherein the cartridge is executed as part of a gear that comprises a resource-constrained processing space of the VM.

8. The method of claim 1, wherein the cartridge is a downloadable cartridge.

9. A system, comprising:
   a memory; and
   a processing device communicably coupled to the memory; and
   a cartridge download component executable from the memory by the processing device, the cartridge download component to:
      receive a location of a cartridge manifest corresponding to a cartridge that is maintained outside of a multi-tenant Platform-as-a-Service (PaaS) system hosting the cartridge download component;
      download the cartridge manifest from the received location;
      parse the downloaded cartridge manifest to determine a source location of files of the cartridge, the source location separate from the multi-tenant PaaS system; and
      cause the files of the cartridge to be obtained from the determined source location for use by at least one node of the multi-tenant PaaS system that is hosting an application requesting the cartridge.

10. The system of claim 9, wherein the cartridges each provide functionality to execute applications on the multi-tenant PaaS system, the functionality comprising at least one of configuration templates, scripts, dependencies, or features to add to the applications.

11. The system of claim 9, wherein the cartridge manifest comprising a file detailing features of the cartridge and comprising fields utilized by the multi-tenant PaaS system to deploy the cartridge to the at least one node.

12. The system of claim 9, wherein the location of the cartridge manifest is a Uniform Resource Locator (URL).

13. The system of claim 9, wherein the cartridge download component to parse the cartridge manifest further comprises the cartridge download component to locate a source location field of the cartridge manifest and determine data of the source location field to indicate the source location of the files of the cartridge.

14. The system of claim 13, wherein the source location of the files of the cartridge is a Uniform Resource Locator (URL).

15. The system of claim 9, wherein the node is a virtual machine (VM) hosting the application, and wherein the cartridge is executed as part of a gear that comprises a resource-constrained processing space of the VM.

16. A non-transitory machine-readable storage medium including instructions that, when accessed by a processing device, cause the processing device to perform operations comprising:
   receiving, by the processing device of a multi-tenant Platform-as-a-Service (PaaS) system, a location of a cartridge manifest corresponding to a cartridge that is maintained outside of the multi-tenant PaaS system;
   downloading, by the processing device, the cartridge manifest from the received location;
   parsing, by the processing device, the downloaded cartridge manifest to determine a source location of files of the cartridge, the source location separate from the multi-tenant PaaS system; and
   causing, by the processing device, the files of the cartridge to be obtained from the determined source location for use by at least one node of the multi-tenant PaaS system that is hosting an application requesting the cartridge.

17. The non-transitory machine-readable storage medium of claim 16, wherein the cartridges each provide functionality to execute applications on the multi-tenant PaaS system, the functionality comprising at least one of configuration templates, scripts, dependencies, or features to add to the applications.

18. The non-transitory machine-readable storage medium of claim 16, wherein the cartridge manifest comprising a file detailing features of the cartridge and comprising fields utilized by the multi-tenant PaaS system to deploy the cartridge to the at least one node.

19. The non-transitory machine-readable storage medium of claim 16, wherein the parsing further comprises locating a source location field of the cartridge manifest and determining data of the source location field to indicate the source location of the files of the cartridge.

20. The non-transitory machine-readable storage medium of claim 16, wherein the node is a virtual machine (VM) hosting the application, and wherein the cartridge is executed as part of a gear that comprises a resource-constrained processing space of the VM.

* * * * *